United States Patent [19]

Fecher

[11] Patent Number: 4,898,081

[45] Date of Patent: Feb. 6, 1990

[54] ONE PIECE REAR SEAL FOR SERVOMOTOR

[75] Inventor: Douglas A. Fecher, Granger, Ind.

[73] Assignee: Allied-Signal Inc., Morristown, N.J.

[21] Appl. No.: 238,950

[22] Filed: Aug. 31, 1988

[51] Int. Cl.[4] .............................................. F16J 15/18
[52] U.S. Cl. ................................. 92/165 R; 91/369.1; 91/369.2; 91/376 R; 277/152
[58] Field of Search ............... 92/165 R, 93, 96, 98 R, 92/99; 91/369.1, 369.2, 376 R; 277/152, 207 R

[56] References Cited

U.S. PATENT DOCUMENTS

| | | | |
|---|---|---|---|
| 3,102,453 | 9/1963 | Brooks et al. | 91/369.1 |
| 3,172,335 | 3/1965 | Brooks et al. | 91/369.1 |
| 4,043,251 | 8/1977 | Ohmi | 91/376 R |
| 4,622,882 | 11/1986 | Bischoff et al. | 91/369.1 |

Primary Examiner—Robert E. Garrett
Assistant Examiner—Thomas Denion
Attorney, Agent, or Firm—McCormick, Jr., Leo H.; Ken C. Decker

[57] ABSTRACT

A one piece seal (42) having a resilient body (100) with a peripheral surface (102) on which first and second ribs (104 and 106) engage a housing (19) to establish static seals to prevent environmental air from entering a control chamber (22) and an inner surface (114) with first and second dynamic seals (120 and 128) located adjacent first and second bearing lands (116 and 118). The first and second dynamic seals (120 and 128) which surround a movable projection (38) flex to allow the projection (38) relatively radial movement while the bearing lands (116 and 118) retain the projection (38) in axial alignment during lateral movement of the wall (24).

5 Claims, 2 Drawing Sheets

ONE PIECE REAR SEAL FOR SERVOMOTOR

This invention relates to a one piece rear seal for a servomotor. The rear seal has a cylindrical body with external first and second static seals and internal first and second dynamic seals located adjacent first and second bearing ribs. The rear seal allows a projection on a movable wall in the servomotor to move without allowing air from the surrounding environment to enter a control chamber and thereby effect the development of an output force in the servomotor.

Servomotors are generally employed in power braking systems to provide a power assist to the manual input force of the operator to energize a master cylinder. In servomotors that are operated by partial vacuum and atmospheric pressure, the housing of the servomotor must be sealed to provide an effective power assist. Normally, this type of servomotor has a movable wall which is suspended in vacuum. The movable wall is connected to a hub which has a tubular projection that extends through an opening in the housing of the servomotor. The hub has passageways connected to both sides of the movable wall. A control valve carried inside the tubular projection is responsive to the manual input force transmitted by a push rod connected to the actuation pedal. The control valve interrupts vacuum supplied to one side of the wall while permitting air at atmospheric pressure to flow to the other side thereby creating a pressure differential. The pressure differential that develops across the wall creates a force which moves the hub and causes the tubular projection to slide on a bearing member adjacent a seal in the opening of the housing. As the hub moves, a corresponding output force is transmitted through a push rod to a power piston of a master cylinder.

The most effective output force occurs when the bearing surface holds the tubular projection in axial alignment with the power piston of the master cylinder.

In some instances misalignment can occur between the tubular projection and the power piston because the opening in the housing is eccentric. When the bearing member is inserted in an eccentric opening, there is the possibility of cracking the bearing member or due to manufacturing tolerances, frictional drag will be present during moving of the tubular projection by the wall. If the bearing member has been cracked, after a number of brake applications the surface of the tubular projection may become scored. Thereafter, the scored portion acts as a rasp on the seal to a point where vacuum will not stay in the servomotor. Without vacuum, the servomotor is inoperative and the power piston of the master cylinder must be manually activated to supply the power to the braking system for stopping a vehicle.

This eccentricity problem was solved with a two piece seal disclosed in U.S. Pat. No. 3,724,211. However, most customers have felt the cost of manufacturing and using this two piece seal is not justified when compared to the possible failure rate of one piece seals of the type disclosed in U.S. Pat. Nos 3,289,547 and 4,632,014 or the double one piece seal disclosed in U.S. Pat. Nos. 3,573,871 and 3,958,497.

In an effort to reduce cost while at the same time overcoming the problems of prior art seals, I have developed a one piece seal which provides for bearing capabilities, eccentric manufacturing and radial movement of a tubular projection. The one piece seal has a cylindrical body with a peripheral surface. First and second ribs located on the peripheral surface engage the housing of the servomotor to form static seals that prevent environmental air from entering into the control chamber. The cylindrical body has an axial opening with first and second bearing lands located between first and second dynamic seals. The dynamic seals flex as the projection axially moves within the hub in response to the development of a pressure differential across the wall.

The bearing lands engage the projection while the ribs on the peripheral surface allow some compression during the axial movement of the wall when a side load is applied to the projection. However, under normal operation a tolerance gap between the bearing lands and projection allow the projection to move in an axial manner without touching the bearing lands. This one piece seal effectively prevents environmental air from being communicated to the control chamber while allowing the movable wall unrestricted movement.

An advantage of this one piece seal occurs through the ribs on its peripheral surface which establish a dynamic seal and flexible hinge members adjacent bearing lands on its internal surface and which allow radial movement to maintain a dynamic seal with a axial moving projection.

It is an object of this invention to provide a one piece seal for an opening in the rear shell of a servomotor which compensates for radial and axial movement of a movable member.

These objects and advantages should be apparent from reading this specification while viewing the drawing wherein.

Figure 1:
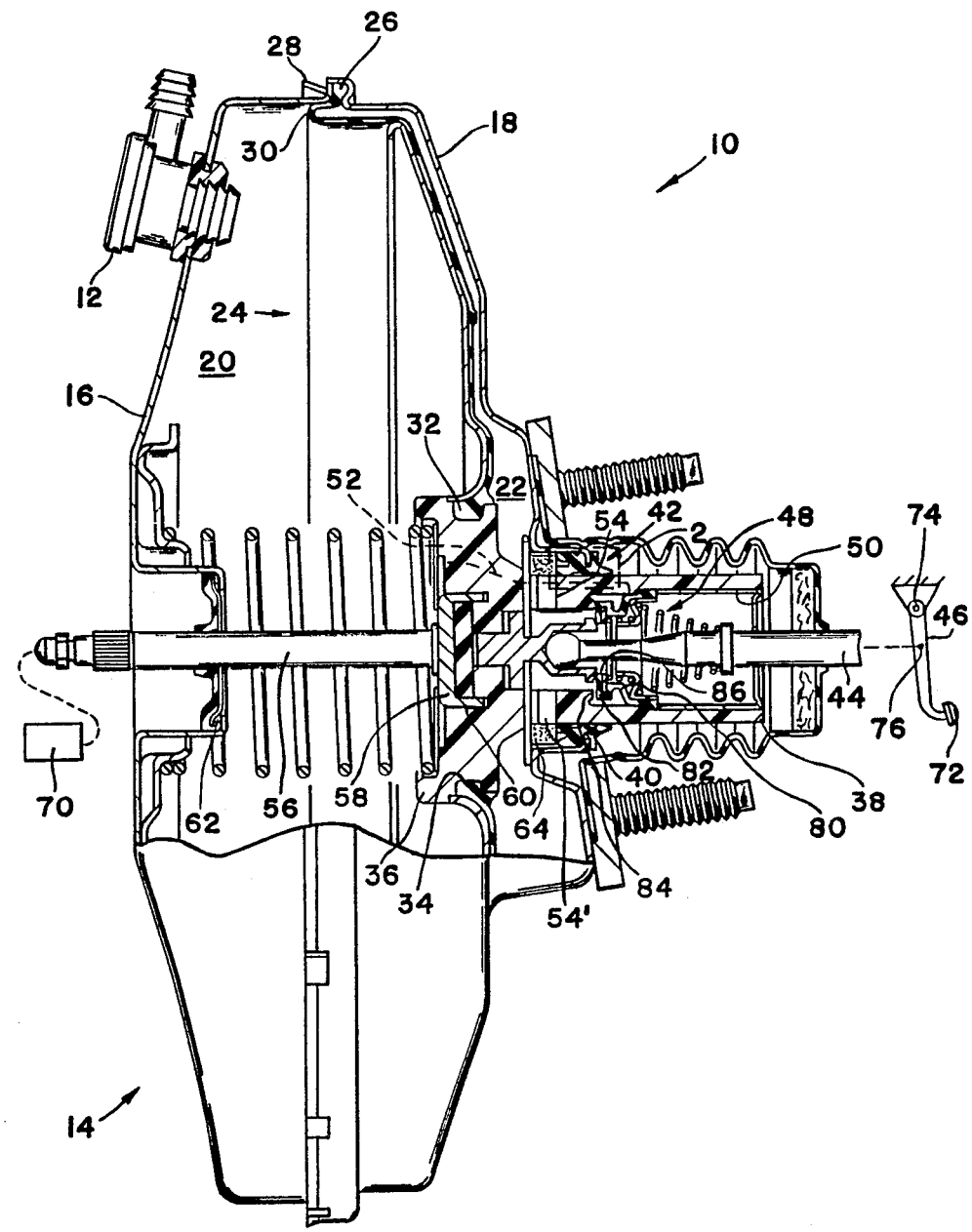
FIG. 1 is a schematic illustration of a brake system having a servomotor with a rear seal made according to the principals of this invention.

The power braking system 10 shown in FIG. 1 is operated by partial vacuum created at the intake manifold of a vehicle. The partial vacuum is communicated through check valve 12 to a servomotor 14 which has a front shell 16 joined to a rear shell 18 to form a housing. There interior of the housing is divided into a front or operational chamber 20 and a rear or control chamber 22 by wall means 24. The wall means 24 has a diaphragm 30 with an outer periphery 26 held by the twist lock connector 28 which joins the front shell 16 to the rear shell 18. The inner periphery 32 of the diaphragm 30 is snapped into a groove 34 of hub means 36. A tubular projection 38 connected to the hub means 36 extends through an opening 40 in the rear shell 18. Seal means 42 holds the tubular projection 38 in axial alignment with a piston of the master cylinder 70 Valve means 48 located in the bore 50 of the tubular projection 38 controls the communication of the partial vacuum through a first passageway 52 from the front chamber 20 of the servomotor 10 to the bore 50 and out a second radial passageway 54, 54' to the rear chamber 22. A push rod 56 which has a head 58 retained in an annular opening 60 in the hub means 36 and extends through a seal 62 of a type shown in U.S. Pat. No. 3,178,191 into a piston in the hydraulic master cylinder 70.

In operation, an operator pushes on pedal 72 causing arm 46 to pivot around pin 74. As arm 46 pivots on pin 74, an input force will be communicated through pin 76 to input rod 44. The force from input rod 44 causes a plunger in the valve means 48 to move and permit resilient member 80 to seat a flexible member 82 on face 84 closing the communication of partial vacuum through passage 52 to the bore 50. Further movement of the plunger permits communication of air under atmospheric pressure to flow through opening 86 into bore 50 out the second to flow passageways 54 and 54' to the rear chamber 22. A resilient filter 64 which surrounds projection 38 covers the outlet of passageways 54 and 54' and attenuates any noise cause by the rush of air into chamber 22.

With partial vacuum in the front chamber 20 and air under atmospheric pressure in the rear chamber 22 a pressure differential develops across the wall means 24. The pressure differential pressure acts on the area of the diaphragm 30 creating a force which causes the tubular projection 38 to slide in seal means 42 as the force is transmitted through push rod 56 to the piston in the master cylinder 70. Movement of this piston pressurizes fluid in the master cylinder 70 to operate the front and rear wheel brakes of a vehicle.

When the axial alignment between the input rod 44, the tubular projection 38, the output push rod 56 and the master cylinder piston is maintained, the most effective and efficient utilization of the force produced by the pressure differential is achieved.

Figure 3:
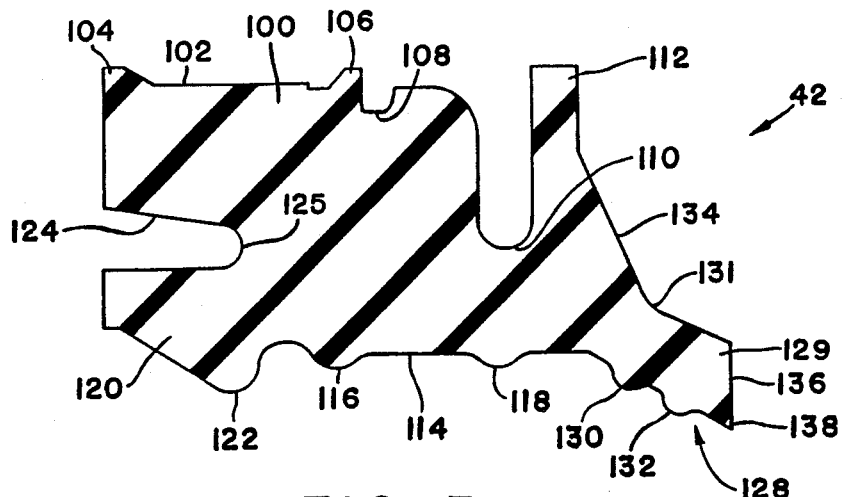
FIG. 3 is an enlarged view of the seal in FIG. 2 in a free state prior to installation into the servomotor of FIG. 1.
Figure 2:
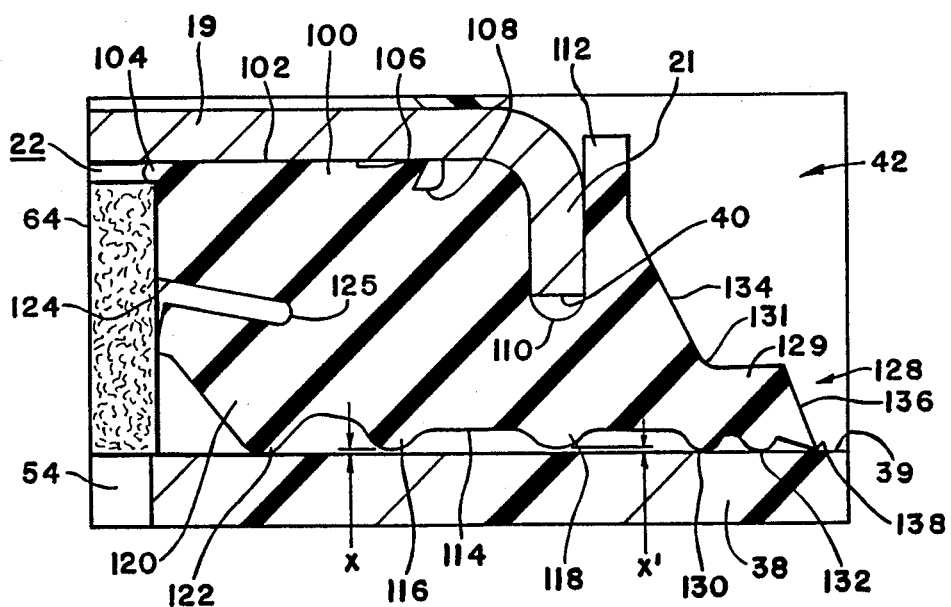
FIG. 2 is an enlarged view of the circumscribed Portion 2 in FIG. 1.

In more particular detail the seal means 42 as shown in FIGS. 2 and 3 consists of a cylindrical body 100 which is designed to have an interference fit with hub 19 on the rear shell 18. As best seen in FIG. 3, ribs 104 and 106 extend above peripheral surface 102 in the free state. A groove 108 adjacent rib 106 allows a portion of rib 106 room to expand on insertion into the hub 19. The engagement of rib 106 with hub 19 forms a first static seal which prevents communication of environmental air into chamber 22 along a flow path between the seal 42 and opening 40. Rib 104 protrudes along the front face of the cylindrical body 100 to establish a secondary or redundant static seal. A groove 110 in the peripheral surface 102 receives lip 21 on hub 19. An annular radial flange 112 adjacent groove 110 engages the exterior surface of lip 21 and extends to at least the axial surface of hub 19 to position seal means 42 in shell 18.

The interior of cylindrical body 100 has an axial opening 114 whose diameter is approximately equal to the outside diameter 39 of tubular projection 38 plus the height of lands 116 and 118 and a gap "x". Lands 116 and 118 which extend from surface 114 form bearing rings that align the tubular projection 38 in opening 40. Land 116 is located in a fist plane which is substantially parallel to rib 106, while land 118 is located in second plane which is substantially parallel to groove 110. Insertion of tubular projection 38 in seal means 42 produces a radial force that acts through lands 116 and 118 to align the tubular projection 38 with the axial center of opening 40. The clearance "x" between the lands 116 and 118 provides for and compensates for eccentricity and clearance between the seal means 42 and tubular projection 38 such that ideally on axial movement of tubular projection 38 no engagement occurs. The space between lands 116 and 118 is filled with a grease which provide a lubricant for the tubular projection 38.

A first rib 120 located on the first end of the cylindrical body 100 has a semi spherical rubbing surface 122 that engages the tubular projection 38. An annular slot 124 extends into the cylindrical body 100 to a point that is approximately midway between the ribs 104 and 106 and as a result a hinge is formed between surface 114 and the bottom 125 of slot 124. This hinge allows rib 120 to flex and allow for changes in expansion caused by temperature and dimensional differences in the tubular projection 38 to maintain a dynamic seal that prevents air from entering chamber 22 along a flow path between the seal means 42 and tubular projection 38. The hinge function is clearly apparent when viewing the location of surface 122 in FIG. 3 in the free state and in FIG. 2 after the tubular projection 38 has been inserted into seal means 42.

A second dynamic seal 128 has an annular flap 129 with first and second rings 130 and 132 which engage the tubular projection 38. Flap 129 extends from the cylindrical body 100 and has a plurality of reinforcing buttress member 134. The junction 131 of the intersection of the buttress member 134 and flap 129 forms a hinge which allows flap 129 to flex and provide for compensation for temperature changes and dimensional changes in the tubular projection 38. The end of seal 128 has a tapered surface 136 with an apex 138. Apex 138 engages the tubular projection 38 and wipes the same clean of any material such as dirt or dust that may act as a abrasive and destroy either ring 130 or 132. As seen in the free state in FIG. 3, the hinge allows seal 128 to flex and surround the tubular projection 38 in FIG. 2.

In operation when the valve means 48 is activated to create the operational pressure differential, wall 24 moves to provide an output force and as a result tubular projection 38 moves along an axial path. As tubular projection 38 moves with respect to seal means 42, surfaces 122, 130 and 132 flex to follow the contour on the tubular projection 38 and maintain a dynamic seal which prevents air from entering chamber 22 along the outside of the tubular projection 38. At the same time ribs 104 and 106 maintain a static seal that prevents air from flowing along the hub 19 to the interior or chamber 22.

Thus, we have provided a servomotor with a seal means 42 which compensates for dimensional changes between a tubular projection 38 and an opening 40 in shell 18 whether caused by temperature or manufacturing tolerances. This one piece seal means 42 provides sufficient bearing strength to maintain the tubular projection 38 in axial alignment within the servomotor 14 and yet is flexible to compensate for surface changes.

I claim:

1. In a brake booster having a housing with an interior divided by a wall into a control chamber and an operational chamber, said wall having a projection that extends through an opening in said wall, said projection moving in said opening as the wall moves in the housing in response to a pressure differential between said control and operational chambers, the improvement in a seal which surrounds said projection to prevent communication of environmental air to said operational chamber along a flow path between the housing and projection that would effect said pressure differential, said seal comprising:

a resilient body having a first end and a second end, said resilient body having a peripheral surface that extends from said first end to said second end, said peripheral surface having a first groove separated from a second groove by a cylindrical surface, a first rib adjacent said first groove and a second rib adjacent said first end and a flange adjacent said second groove, said first rib engaging said housing to form a first static seal with said housing, said second rib engaging said housing to form a second static seal with said housing, said housing having a lip that extends into said second groove to fix the position of said resilient body with respect to said opening, said resilient body having first and second lands located between first and second dynamic seals, said first and second dynamic seals engaging said projection to prevent communication of environmental air into said control chamber, said first and second dynamic seals flexing to allow said projection limited radial movement into engagement with said first and second lands which maintains the projection in substantial axial alignment.

2. The brake booster as recited in claim 1, wherein said resilient body further includes:
   a retention groove located between said first and second lands for holding a lubricant for said projection.

3. The brake booster as recited in claim 2, further including:
   a plurality of radial openings for connecting the interior of the projection to said control chamber; and
   filter means carried on said projection and covering said radial openings for attenuating noise cause by the communication of environmental air from the interior of said projection to said control chamber.

4. The brake booster as recited in claim 3, wherein said flange engages said lip on said housing to prevent said resilient body from moving into said control chamber.

5. The brake booster as recited in claim 4, wherein said first dynamic seal has a tapered surface which engages said projection to remove surface contamination before engagement with first and second dynamic seals.

* * * * *